United States Patent [19]

Shimada et al.

[11] Patent Number: 4,760,828
[45] Date of Patent: Aug. 2, 1988

[54] IGNITION TIMING CONTROLLER FOR MULTI-CYLINDER ENGINE

[75] Inventors: Shiro Shimada; Hiroshi Haraguchi, both of Kariya; Toshiharu Iwata, Nukata, all of Japan

[73] Assignee: Nippondenso Co., Ltd., Kariya, Japan

[21] Appl. No.: 16,936

[22] Filed: Feb. 20, 1987

[30] Foreign Application Priority Data

Feb. 21, 1986 [JP] Japan ................................. 61-37682

[51] Int. Cl.⁴ ............................................. F02P 5/04
[52] U.S. Cl. ..................................... 123/425; 123/435
[58] Field of Search ....................... 123/425, 435; 73/35

[56] References Cited

U.S. PATENT DOCUMENTS 4,471,739  9/1984  Yoshida et al. ..................... 123/425
4,558,674 12/1985  Okado et al. ....................... 123/425
4,565,171  1/1986  Sugiura et al. ..................... 123/425
4,574,758  3/1986  Yagley ............................... 123/425
4,646,522  3/1987  Mamiya et al. .................... 123/425

Primary Examiner—Raymond A. Nelli
Attorney, Agent, or Firm—Cushman, Darby & Cushman

[57] ABSTRACT

An ignition timing control arrangement for an internal combustion engine having a plurality of cylinders. It is determined whether the same cylinder is knocking on successive engine cycles or whether different cylinders are knocking. The ignition timing of only a single cylinder is retarded to cause a non-knocking ignition if the same cylinder is knocking on successive engine cycles. However, ignition timing of all cylinders is retarded to minimize the knocking and maximize the engine torque if different cylinders are knocking.

6 Claims, 3 Drawing Sheets

IGNITION TIMING CONTROLLER FOR MULTI-CYLINDER ENGINE

BACKGROUND OF THE INVENTION

1. Field of the Invention

This invention relates to an ignition timing controller for a multi-cylinder internal-combustion engine. It is capable of delaying ignition timing for each of the multiple cylinders upon the detection of knocks in the individual cylinders of the multicylinder internal-combustion engine.

2. Description of the Prior Art

Ignition timing controllers are disclosed in, for example, Japanese patent unexamined patent publication Nos. 58-53675 and 58-165574.

A known ignition timing controller delays ignition timing for a particular cylinder when that cylinder is detected to be knocking. It delays ignition timings for all cylinders, without regard to which of them may be knocking when the intensity of engine knock or the frequency of engine knock exceeds a predetermined level. This allows the engine to deal quickly with a critical operating condition such as, for example, acceleration, during which knocking is likely to occur.

Although such an arrangement can respond quickly to a knocking problem, it has some operational drawback. It is possible that knocking occurs substantially continuously in a particular cylinder, rather than in all cylinders of the internal combustion engine. It may be that the knock intensity of a particular cylinder may be very high, even though the knock intensity of the other cylinders may be low. When ignition timing is indiscriminately delayed for all cylinders under such conditions, certain cylinders are retarded that should not be. This deteriorates engine performance.

SUMMARY OF THE INVENTION

The present invention provides an ignition timing controller for a multi-cylinder internal combustion engine which delays the respective ignition timings for all the cylinders only when all cylinders really need to be delayed so that the performance of the internal combustion engine will not be deteriorated by the ignition control operation. Otherwise, only the cylinders requiring delay are delayed.

In order to accomplish this, the present invention provides an ignition timing controller for a multi-cylinder internal combustion engine, as illustrated in general block diagram in FIG. 1. A knock detecting means M2 detects knocks generated in the individual cylinders of an internal combustion engine M1. A first discriminating means M3 decides that the internal combustion engine M1 is in a continuous knocking state when the frequency of knocking detected by the knock detecting means M2 is greater than a predetermined value. A second discriminating means M4 discriminates between a continuous knocking state of a single cylinder and a continuous knocking state of the different cylinders. An ignition timing control means M5 delays the respective ignition timings for all the cylinders when it is decided by the second discriminating means that the different cylinders are in a continuous knocking state, and delays only the ignition timing for a single cylinder in a continuous knocking state when it is decided by the continuous knocking state discriminating means that only the single cylinder is in a continuous knocking state or that the internal combustion engine is in a sporadic knocking state.

The continuous knocking state deciding means decides that the internal combustion engine is in a continuous knocking state when the frequency of knocking exceeds a predetermined value. The second discriminating means discriminates between a continuous knocking state of a single cylinder and a continuous knocking state of different cylinders. The ignition timing control means decides that all the cylinders are knocking continuously when the second discriminating means decides that the different cylinders are in a continuous knocking state, and delays the respective ignition timings for all the cylinders, and delays only the ignition timing for a cylinder which is knocking when it is decided that a single cylinder is in a continuous knocking state or that the internal combustion engine is in a sporadic knocking state.

DETAILED DESCRIPTION OF THE PREFERRED EMBODIMENT

The presently preferred embodiment of the present invention will be described hereinafter with reference to the accompanying drawings.

Figure 1:
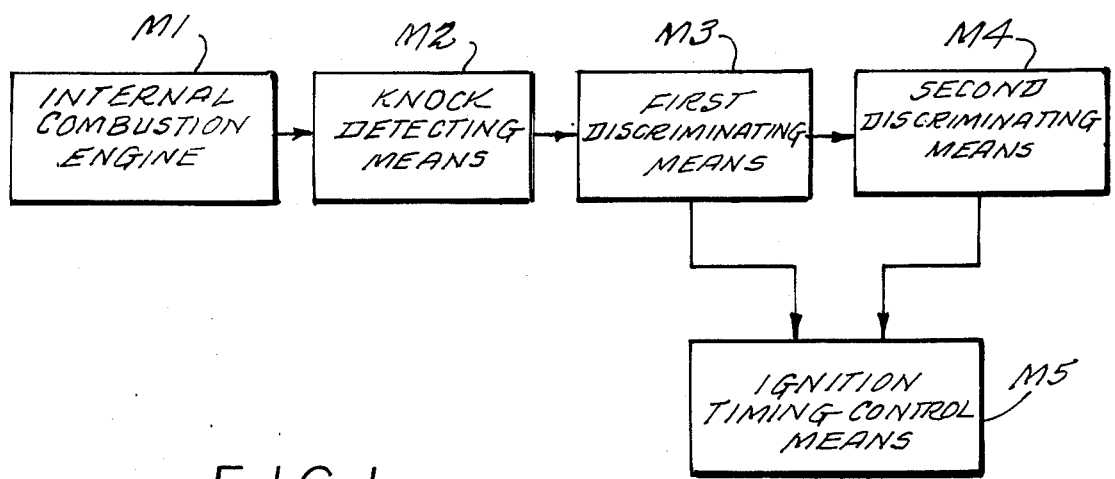
FIG. 1 is a block diagram showing an ignition timing controller according to the present invention.
Figure 2:
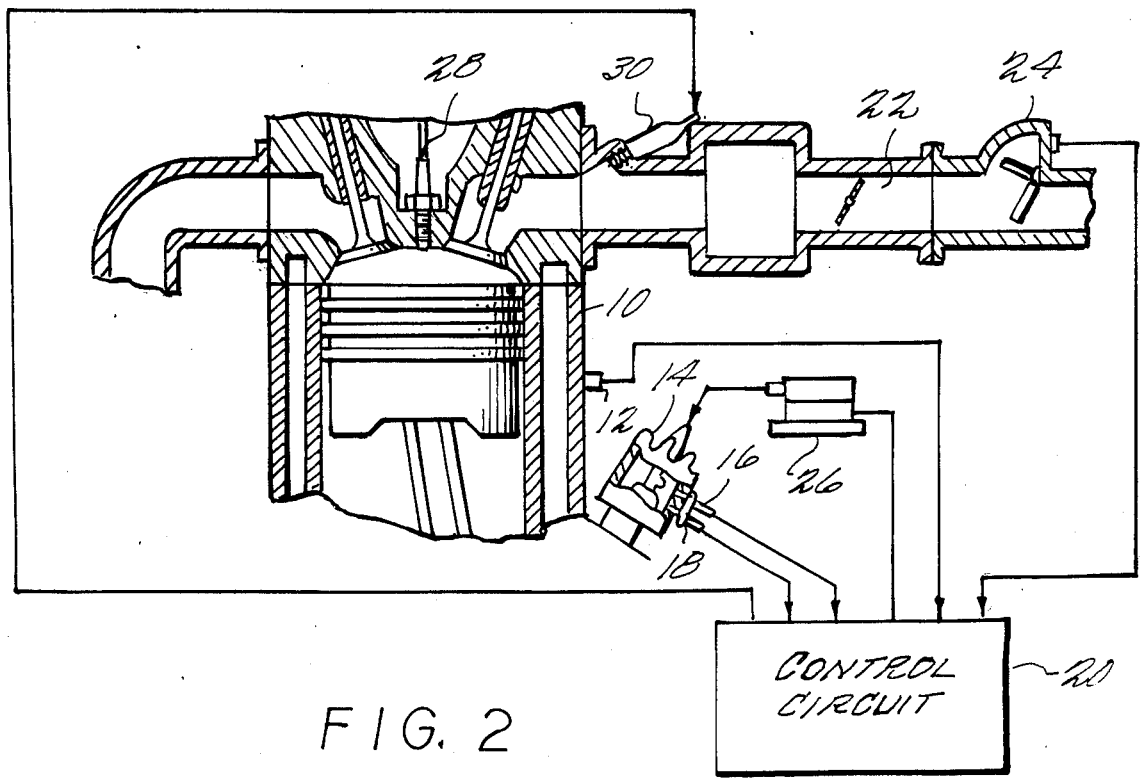
FIG. 2 is a fragmentary sectional view of an internal combustion engine incorporating the present invention.

FIG. 2 is a fragmentary sectional view of an internal combustion engine incorporating the present invention. A cylinder block 10 has four cylinders. A knock sensor 12 is attached to cylinder block 10. Knock sensor 12 is a well-known device which converts mechanical vibrations into the corresponding electrical amplitude variations, such as, for example, a piezoelectric element or an electromagnetic element. A distributor 14 is provided with a cylinder discriminating crank angle sensor 16 and another crank angle sensor 18. Crank angle sensor 16 produces one pulse for every one rotation of the distributor shaft, namely, every two rotations of the crankshaft (every 720° crank angle), for example, when the piston of the first cylinder is at top dead-center (TDC). Crank angle sensor 18 produces twenty-four pulses every one rotation of the distributor shaft, namely, every 30° crank angle.

Electric signals produced by knock sensor 12 and crank angle sensors 16 and 18 are provided to a control circuit 20. A signal indicating the flow rate of the intake air, produced by an air flow sensor 24 provided in the intake passage of the internal combustion engine is also provided to the control circuit 20. Control circuit 20 provides an ignition signal to an igniter 26. A spark current produced by the igniter 26 is distributed to the respective spark plugs 28 of the cylinders by the distributor 14.

The internal combustion engine is provided with various sensors for detecting the parameters of the operating condition thereof, and the control circuit 20 also controls other components including a fuel injection system. However, those sensors and the control of those components are well known and not related directly to the present invention, and hence the description thereof will be omitted.

Figure 3:
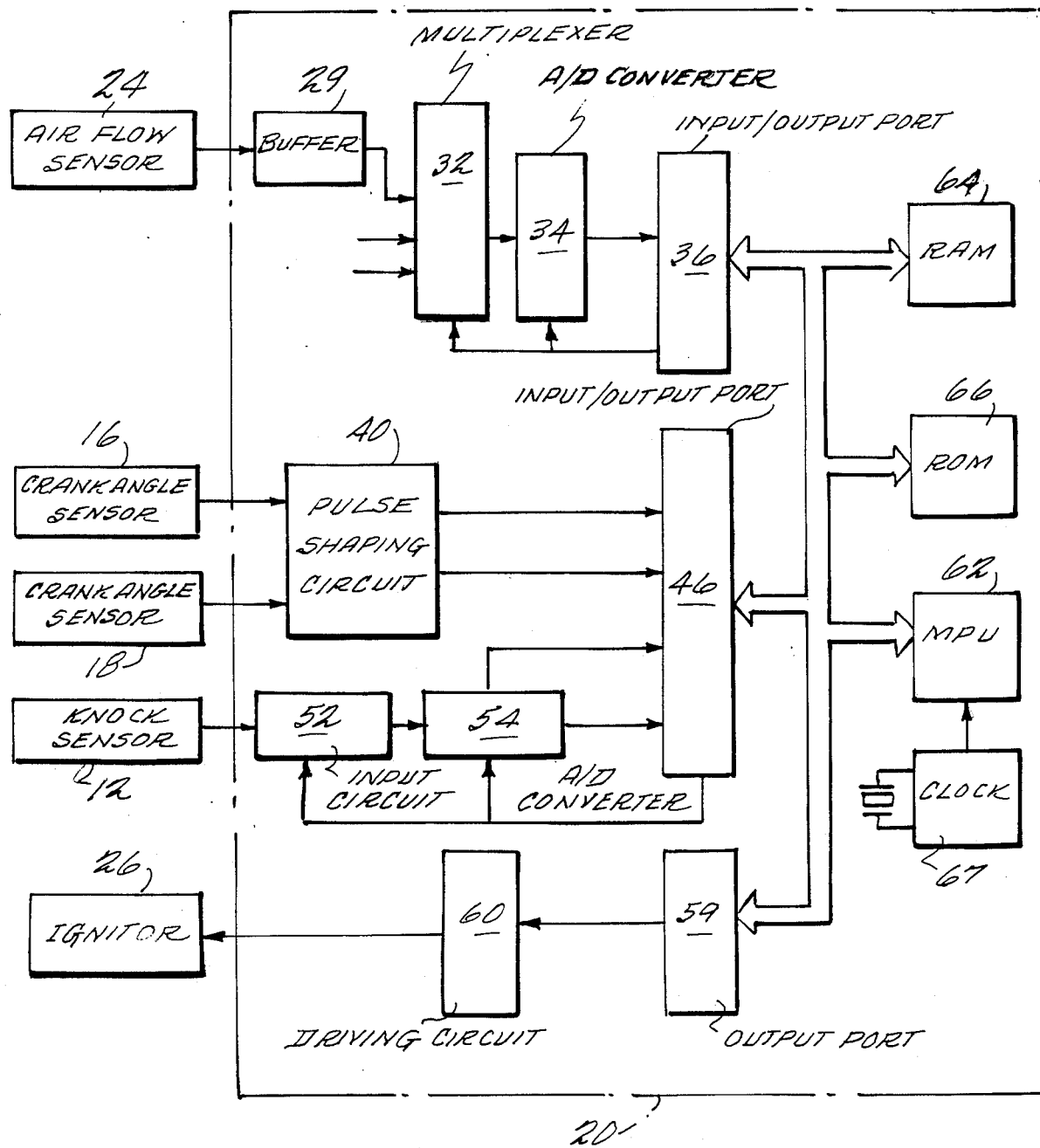
FIG. 3 is a block diagram of an ignition timing controller, according to the present invention, incorporated into the internal combustion engine shown in FIG. 2.

FIG. 3 is a block diagram of an ignition timing controller, according to the present invention, incorporated into the internal combustion engine shown in FIG. 2. A voltage signal produced by the airflow sensor 24 is transmitted through a buffer 29 to an analog multiplexer 32. A microcomputer applies the voltage signal selectively to an A/D converter to convert the voltage signal into a corresponding binary signal. Then, the binary signal is given through an input-output port 36 to the microcomputer. Pulses produced by the crank angle sensor 16 every 720° crank angle, and pulses produced by the crank angle sensor 18 every 30° crank angle are transmitted through a pulse shaping circuit 40 to an input-output port 46. The output signal of the knock sensor 12 is transmitted through an input circuit 52 and an A/D converter 54 to the input-output port 46. The A/D converter 54 starts A/D conversion operation upon the reception of an A/D conversion start signal through the input-output port 46 and a line 56 from the microcomputer. Upon the completion of the A/D conversion operation, the A/D converter 54 gives an A/D conversion completion signal through a line 58 and the input-output port 46 to the microcomputer. An ignition signal given by the microcomputer through an output port 59 to a driving circuit 60 is converted into a driving signal by the driving circuit 60, then the igniter 26 is energized by the driving signal. Ignition control is executed according to the duration and connecting timing of the ignition signal.

The microcomputer comprises, as the principal components thereof, the input-output ports 36 and 46, the output port 59, a microprocessor (hereinafter abbreviated to "MPU") 62, a random access memory (hereinafter abbreviated to "RAM") 64, a read only memory (hereinafter abbreviated to "ROM") 66, a clock generating circuit 67, and a bus 68 interconnecting those components. The microcomputer processes data according to a control program stored in the RQM 66.

Figure 4:
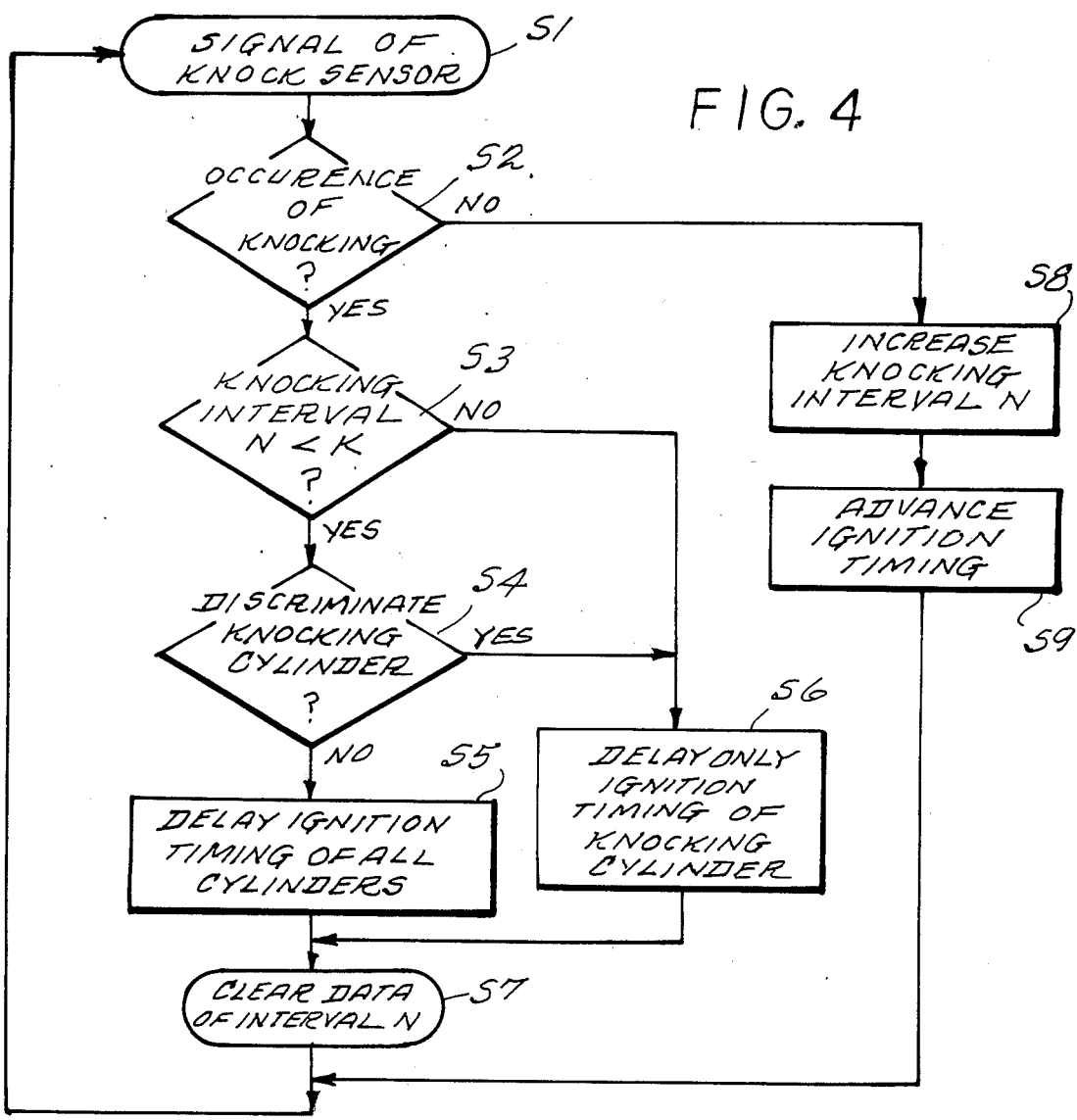
FIG. 4 is a flow chart showing an ignition timing control routine for the microcomputer of the ignition timing controller shown in FIG. 3.

FIG. 4 is a flow chart showing an ignition timing control routine according to the present invention, among the control functions of the microcomputer. According to this control routine, in a continuous knocking state in which the frequency of knocking is greater than a predetermined value, it is decided that knocks are generated continuously in all the cylinders when knocks are generated continuously in different cylinders, and then the respective ignition timings for all the cylinders are delayed indiscriminately, and only the ignition timing for the cylinder generating knocks is delayed individually when knocks are generated in the same cylinder or knocks are generated sporadically. When the frequency of knocking is smaller than the predetermined value, the respective ignition timings for the cylinders are controlled individually. The control program stored in the ROM 66 for the foregoing control operation will be described hereinafter with reference to FIG. 4.

At step S1, an output signal of the knock sensor 12 is applied through the input circuit 52 and the A/D converter 54 to the microcomputer. At step S2, a decision is made on the basis of the output signal of the knock sensor 12 as to whether or not knocks are generated. The decision is synchronized with each of the ignition timing for all the cylinders or every predetermined crank angle. When the decision at step S2 is YES, the routine goes to step 3 and the interval between knocks is examined at step S3. The internal N between the successive knocks is counted at step S8 described later. In this embodiment, when the knocking interval N of ignition cycles between the successive knocks is less than predetermined number T corresponding to eight ignition cylinders (or when the interval period between the successive knocks is less than predetermined time corresponding to the rotational speed of the engine), it is decided that the internal combustion engine is in a continuous knocking state. That is, when knocking occurs twice in a time corresponding to eight ignition cycles, it is decided that the frequency of knocking is greater than the predetermined value.

When it is decided that the internal combustion engine is in a continuous knocking state at step S3, the routine goes to step S4 for knocking cylinder discrimination. At step S4, a knocking cylinder is discriminated on the basis of the output signals of the crank angle sensors 16 and 18, and then a decision is made as to whether or not the present knocking cylinder is the knocking cylinder discriminated in the preceding cycle of knocking cylinder discrimination and stored in the memory. When the decision at step S4 is NO, namely when at least two cylinders are in the condition of knocking it is deemed, that all the cylinders are in continuous knocking state, and then the respective ignition timings for all the cylinders are delayed by a fixed angle at step S5. Accordingly, the follow-up control of the ignition timing for adjusting the actual ignition timing to the ideal one which minimizes the knocking and maximizes the engine torque during the transient operating condition of the internal combustion engine, when has been unsatisfactory in the conventional individual ignition timing control system, is improved, and thereby damaging the internal combustion engine is avoided.

When the decision at step S4 is YES, namely, when the same cylinder is in the continuous knocking state, the routine goes to step S6, where only the ignition timing for the knocking cylinder is delayed by a fixed angle. Accordingly, the needless delaying of the ignition timings for the rest of the cylinders which are not knocking, and the resultant deterioration of the performance of the internal combustion engine is avoided.

When it is found, at step S3, that the frequency of knocking is smaller than the predetermined value, namely, when the interval between the successive knocking is greater than a predetermined value, the internal combustion engine is in the condition of sporadic knocking, so that the routine goes to step S6 for the normal individual ignition timing control, in which only the ignition timing for the knocking cylinder is delayed by a fixed angle.

Ignition timing is delayed only the same cylinder which already detected as the knocking cylinder at preceding cycle in step S4. At steps S5 and S6, the ignition timing is delayed by an angle corresponding to the intensity of the out signal of the knock sensor.

After the ignition timing delaying control at step S5 or S6 has been completed, the routine goes to step S7, where the previously stored data of the knocking internal N is cleared to prepare for the next execution of step S3.

When the decision at step S2 is NO, namely, when a decision is made that no knock is generated, the routine goes to step S8, where the reference knocking internal which is used as a comparing number N for comparing to the predetermined standard number T is increased, by one every one ignition cycle.

At step S9, the angle of advancement of ignition timing is made if necessary For example, when no knock is generated for a time over a predetermined time or for a time corresponding to a predetermined number of ignition cycles, the ignition timing for each cylinder is advanced by a fixed angle.

Upon the completion of the operation at step S7 or S9, the routine returns to step S1, and then the foregoing steps are repeated.

Figure 5:
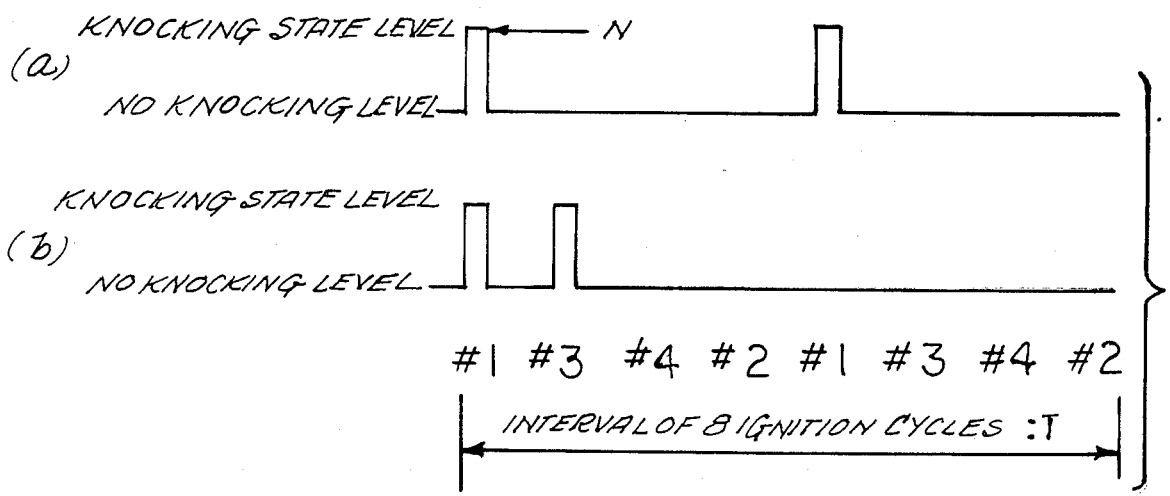
FIG. 5 is a diagram showing waveforms of knock detection signals produced by a knock sensor.

FIG. 5 shows the waveforms of the output signals of the knock sensor 12. When the same cylinder (the first cylinder) is in a continuous knocking state in which the frequency of knocking is greater than the predetermined value such as eight ignition timings as shown in FIG. 5a, only the ignition timing for the same cylinder (the first cylinder) is delayed. When different cylinders, for example, the first and third cylinders (#1 and #3), are in a continuous knocking state, the ignition timings for all the cylinders are delayed indiscriminately by a fixed angle.

Although the ignition timings for all the cylinders are delayed indiscriminately by a fixed angle in this embodiment, when different cylinders are in a continuous knocking state, it is also possible to delay the ignition timings for the individual cylinders simultaneously by different angles previously set for the individual cylinders on the basis of the individual knocking characteristics of the individual cylinders.

As should be apparent from the foregoing description, ignition timings for the cylinders of a multi-cylinder internal combustion engine can be delayed individually for satisfactory ignition timing control, and the ignition timings for all the cylinders are delayed on when all the cylinders is expected to generate knocks. Thus, the present invention is capable of improving the follow-up control of the ignition timing during a transient operating condition of the internal combustion engine, such as during acceleration without deteriorating the performance of the internal combustion engine.

I claim:

1. An ignition timing arrangement for a multi-cylinder internal combustion engine, comprising:
   knock detecting means for detecting knocks generated in the individual cylinders of said engine;
   first discriminating means for comparing the frequency of knocking detected with a predetermined value, and generating a continuous knocking signal when the frequency of knocking is greater than the predetermined value, and generating a sporadic knocking signal when the frequency of knocking is less than the predetermined value;
   second discriminating means for discriminating which cylinder among the plurality of cylinders is knocking and generating a same cylinder signal when the same cylinder is determined to be knocking as successive engine cycles and generating a different cylinder signal when it is determined that different cylinders are knocking on successive engine cycles;
   ignition timing control means for delaying the ignition timings for all the cylinders in response to the different cylinder signal, and for delaying individually the ignition timing for only the knocking cylinder when that one cylinder is sporadically knocking or the same cylinder signal is generated indicating continuous knocking of that cylinder.

2. An ignition timing controller according to claim 1 further comprising:
   a crank angle sensor for generating a crank signal corresponding to predetermined crank angle, and wherein said second discriminating means discriminates knocking cylinder by using the crank signal generated by the crank angle sensor.

3. An ignition timing controller according to claim 1, wherein the first discriminating means compares a knocking interval between the successive knocks as the frequency of knocking with predetermined value.

4. An ignition timing controller according to claim 3, further comprising a counting means for counting a number of an ignition cycles within a period from the occurrence of knocking to the next occurrence of knocking in order to measure the knocking interval.

5. An ignition timing controller according to claim 1, further comprising advancing means for advancing the ignition timing when the knock detecting means detects no knocks for a time greater than a predetermined time.

6. An ignition timing arrangement for a multi-cylinder internal combustion engine, comprising:
   knock detecting means for detecting knocks generated in the individual cylinders of said engine;
   first discriminating means for comparing the frequency of knocks detected by the knock detecting means with a predetermined value, and generating a continuous knocking signal when the frequency is greater than the predetermined value and a sporadic knocking signal when the frequency is less than the predetermined value;
   second discriminating means for discriminating which cylinder is knocking and generating (a) a same cylinder signal when the same cylinder is determined to be knocking and when the continuous signal is generated by the first discriminating means and (b) a different cylinder signal when it is determined that different cylinders are knocking and when the continuous signal is generated by the first discriminating means; and
   ignition timing control means for delaying the ignition timings for all cylinders in response to the different cylinder signal, and for delaying the ignition timing for only the knocking cylinder when that one cylinder is sporadically knocking or the same cylinder signal is generated indicating continuous knocking of that cylinder.

* * * * *